United States Patent [19]
Crain

[11] Patent Number: 6,082,304
[45] Date of Patent: Jul. 4, 2000

[54] FEEDYARD INFORMATION SYSTEM AND ASSOCIATED METHOD

[76] Inventor: Scott L. Crain, 804 E. Washington, Meade, Kans. 67864

[21] Appl. No.: 09/111,823

[22] Filed: Jul. 8, 1998

[51] Int. Cl.[7] .................................................. A01K 1/03
[52] U.S. Cl. ....................................... 119/421; 119/51.01
[58] Field of Search ............................... 119/421, 51.01, 119/51.02, 57.92, 515, 518

[56] References Cited

U.S. PATENT DOCUMENTS

| | | | |
|---|---|---|---|
| 3,806,001 | 4/1974 | Pratt | 222/132 |
| 4,733,971 | 3/1988 | Pratt | 366/141 |
| 4,808,111 | 2/1989 | Pratt | 434/191 |
| 4,815,042 | 3/1989 | Pratt | 366/141 |
| 4,889,433 | 12/1989 | Pratt | 366/141 |
| 4,910,024 | 3/1990 | Pratt | 426/2 |
| 5,008,821 | 4/1991 | Pratt et al. | 364/413.01 |
| 5,032,029 | 7/1991 | Pratt et al. | 384/585 |
| 5,219,224 | 6/1993 | Pratt | 366/141 |
| 5,315,505 | 5/1994 | Pratt et al. | 364/413.01 |
| 5,340,211 | 8/1994 | Pratt | 366/141 |
| 5,369,032 | 11/1994 | Pratt | 435/290 |
| 5,401,501 | 3/1995 | Pratt | 424/93.45 |
| 5,457,627 | 10/1995 | Cureton et al. | 119/51.01 |
| 5,573,002 | 11/1996 | Pratt | 128/660.07 |
| 5,636,118 | 6/1997 | Brewster et al. | 119/51.02 |
| 5,673,647 | 10/1997 | Pratt | 119/51.02 |
| 5,803,906 | 9/1998 | Pratt et al. | 600/300 |
| 5,836,880 | 11/1998 | Pratt | 600/443 |
| 5,878,402 | 3/1999 | Brewster et al. | 119/51.02 |

OTHER PUBLICATIONS

Maday, John, "How Data Becomes Information Networking and Pooled Feedyard Data Streamling Decision–Making Process", *Drovers*, May 1998, pp. 50 & 52.

*Primary Examiner*—Peter M. Poon
*Assistant Examiner*—Judith A. Nelson
*Attorney, Agent, or Firm*—Robert H. Kelly; Holland & Hart LLP

[57] ABSTRACT

A feedyard information system, and an associated method generates pooled data taken from more than one feedyard. Data elements of the pooled data are formed in manners such that the data elements are free of identifiers which specifically identify the particular feedyards from which the data elements pertain. The pooled data is provided to individual feedyards. A feedyard manager or consultant is able to access the pooled data, thereby to be able to make better-informed decisions related to operation of the feedyard and confinement-fed animals thereat.

10 Claims, 3 Drawing Sheets

FEEDYARD INFORMATION SYSTEM AND ASSOCIATED METHOD

The present invention relates generally to feedyards used for the commercial feeding of confinement-fed animals, such as cattle feedyards. More particularly, the present invention relates to an information system, and an associated method, which provides data from which to facilitate judgments relating to the confinement-fed animals.

Pooled data from more than one feedyard is provided so that the feedyard management decisions can be based upon regional data, not merely the data obtained at a single feedyard. Data elements of the pooled data are free of identifiers which identify the particular feedyard from which the data elements are derived. Privacy of information related to the competitive position of an individual feedyard is thereby maintained.

A feedyard manager or consultant is able advantageously to make use of the pooled data to make better-informed judgments, for instance, to maximize better the feed efficiency of the feedyard or to make judgments related to individual ones, or pens, of the confinement-fed animals. Operation of an embodiment of the feedyard information system is further able to display both locally-obtained data and the pooled data to the feedyard manager or consultant. The display facilitates improved analysis by a feedyard manager or consultant of the operation of the feedyard and the confinement-fed animals located thereat.

BACKGROUND OF THE INVENTION

Commercial feedyards provide facilities for the feeding of large numbers of confinement-fed animals, such as cattle. A significant number of feedyards are operated throughout the United States, and elsewhere. For instance, in the United States, about 1,500 feedyards presently operate. Many of such feedyards feed and process in excess of 5,000 animals per year. And, many of such feedyards are independently owned and operated. That is to say, individual ones of the feedyards many times form stand-alone, and independent, business entities.

Each of the feedyards typically utilizes one or more information systems to facilitate data collection at the feedyards.

Various information systems have been developed for feedyard operations. For instance, accounting, hospital, and feed-management systems have been developed and customized for feedyard operations. Such systems are intended to provide a feedyard manager or consultant with data to facilitate operation of the feedyard and to permit more-informed judgments to be made in feedyard operation decision making.

Different ones of the information systems have been developed by different entities, many times not permitting integration with one another. Some of the benefits provided by the use of computer-based information systems have been offset by the lack of integration between the different information systems of a single feedyard. The amounts of data which must be reviewed by a feedyard manager or consultant to facilitate the making of decisions to optimize the yard production, such as animal health and weight-gain is sometimes so significant, and provided to the manager or consultant in an inconvenient form, so as to significantly reduce the benefits of such systems.

Also, because the feedyards are many times independently-owned and operated, the feedyard manager or consultant has access only to data of the particular feedyard at which the manager or consultant is employed. Access to data related to feedyards located in a particular region would be helpful in the determination, for instance, of whether or not weather conditions are the cause of a feedyard condition. That is to say, a weather condition common to an entire region of feedyards might be likely to cause the same feedyard trends in individual ones of the feedyards of the entire region. A feedyard-specific trend, or a professional's practice-specific trend, in contrast, would be likely to be exhibited in only the particular feedyard.

Because of the independent ownership and operation of different feedyards, the separately-owned feedyards are oftentimes effectively in competition with one another. Data pertaining to the operation of a particular feedyard, if provided to another feedyard, together with the identity of the originating feedyard, might give others of the feedyards a competitive advantage over the originating feedyard.

While systems by which to pool data and exchange data between feedyards have been developed, such existing systems do not provide appropriate safeguards to prevent the identification of the particular feedyard from which data is obtained.

A manner by which to pool data from more than one feedyard while providing such data in a system free of identifiers which identify the particular feedyard from which data elements of the pooled data are derived would therefore be advantageous. Also, a feedyard consultant might provide consulting services for more than one feedyard. Because each feedyard might have several information systems, and the various feedyards might have different types of information systems, the consultant shall need to know how to access a potentially large number of information systems.

A system by which better to facilitate display of data provided by operation of information systems of a feedyard would therefore also be advantageous.

It is in light of this background information related to feedyards that the significant improvements of the present invention have evolved.

SUMMARY OF THE INVENTION

The present invention, accordingly, advantageously provides a feedyard information system, and an associated method, from which data can be provided to facilitate feedyard management and consulting of a feedyard which contains confinement-fed animals.

In one aspect of the present invention, data associated with feedyards located within a selected region is pooled together to form pooled data. Data elements of the pooled data are free of identifiers which identify the particular feedyard from which the data elements are derived. Once formed, the pooled data is provided to the feedyards. A feedyard manager, consultant, or other appropriate party is able to make use of the pooled data to make better-informed judgments and decisions related to operation of the feedyard. Because the pooled data is free of identifiers which identify the particular feedyard from which the data is derived, privacy of data pertaining to a particular feedyard is maintained. Once received at a feedyard, the pooled data is, for instance, compared with locally-generated data to provide indications of similarities, or disparities, of the feedyard relative to feedyards throughout a selected region. Responsive to analysis of the pooled data, or comparisons between the local and pooled data, better-informed judgments can be made regarding operation of the feedyard and that of the confinement-fed animals fed therein.

In another aspect of the present invention, a central computer is provided which receives, such as by ASCII files attached to e-mail or other store-and-forward signaling, data from individual feedyards. Once the data is received, the central computer pools together the data of various feedyards in a selected region. Once pooled together, the data is returned, also by way of an ASCII file attached to an e-mail message or other store-and-forward signal, to the feedyards. When pooled together, the data elements of the pooled data are caused to be free of identifiers which specifically identify from which of the feedyards the data elements are derived.

In another aspect of the present invention, a feedyard computer is provided which receives feedyard data related to the feedyard to which the feedyard computer is associated. Such local data is supplied, for instance, by way of networked connections with other locally-positioned computer stations upon which conventional accounting, health, food management, or other software systems are operable. Such data, when received at the feedyard computer is stored at a local data base formed of portions of a memory device of the feedyard computer. The feedyard computer is further coupled to receive pooled data generated external to the feedyard computer and provided thereto by way of an electronic connection. Once received, the pooled data is stored at a regional database portion formed of a memory device of the feedyard computer. Appropriate algorithms executable at the feedyard computer place the local feedyard data, as well as the pooled data, in a form for display upon a computer user interface. A feedyard manager, consultant, or other appropriate party is thereby able to analyze the data and make better-informed decisions responsive thereto.

In these and other aspects, therefore, a feedyard information system, and an associated method for a first feedyard and at least a second feedyard is provided. A first plurality of confinement-fed animals are located at the first feedyard, and at least a second plurality of confinement-fed animals are located at the at least the second feedyard. A first feedyard computer is associated with the first feedyard. The first feedyard computer is coupled to receive data related to the first plurality of confinement-fed animals. At least a second feedyard computer is associated with the at least the second feedyard. The second feedyard computer is coupled to receive data related to the at least the second plurality of confinement-fed animals. A central computer is coupled to the first feedyard computer to receive, in electronic form, signals indicative of the data related to the first plurality of confinement-fed animals. The central computer is also coupled to the at least the second feedyard computer to receive, in electronic form, signals indicative of the data related to the second plurality of confinement-fed animals. The central computer selectively pools the data, of which the signals indicative thereof are received at the central computer, thereby to form pooled data. Data elements of the pooled data are free of identifiers specifically identifying from which of the first and the at least second feedyard computer the data elements are derived. The central computer provides signals, in electronic form, indicative of the pooled data to the first feedyard computer and the at least second feedyard computer.

The present invention and the scope thereof can be obtained from the accompanying drawings which are briefly summarized below, the following detailed description of the presently-preferred embodiments of the invention, and the appended claims.

DETAILED DESCRIPTION

Figure 1:
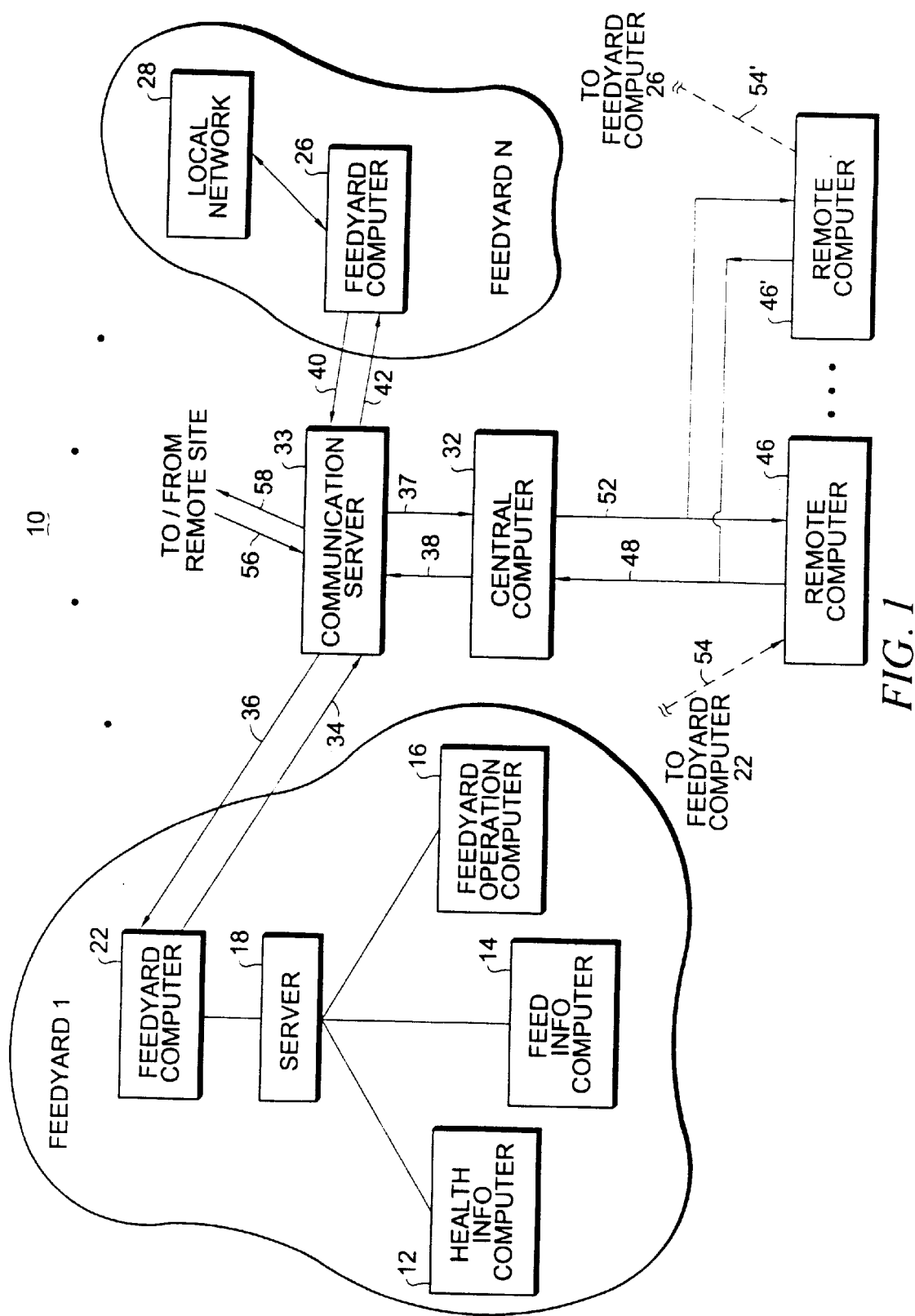
FIG. 1 illustrates the feedyard information system of an embodiment of the present invention.

Referring first to FIG. 1, a feedyard information system, shown generally at 10, of an embodiment of the present invention, is installed in a geographical area encompassing a plurality of feedyards of which two feedyards 1 and N are illustrated in the Figure. As described above, each of the feedyards is operable to feed large numbers of confinement-fed animals. In conventional manner, the confinement-fed animals are maintained, for instance, in a plurality of pens, each pen containing a certain number of the confinement-fed animals. Also in a conventional manner, the confinement-fed animals can be owned by the feedyard or ownership may be retained by another party which contracts with the feedyard to feed the animals in which the retained ownership is maintained.

In the exemplary illustration of the Figure, each of the feedyards, feedyard 1 and feedyard N, are independently operated. That is to say, feedyard 1 and feedyard N are separately owned and are operated independent of one another. Because of such separate ownership, the feedyards might well be in a competitive position with respect to one another.

Operation of the first feedyard is facilitated through the use of information gathering and processing systems. Here, the separate information systems are resident upon various computer stations located at the first feedyard. A health information computer 12 includes algorithms executable thereat to receive and to process health information data related to the confinement-fed animals of the first feedyard. A feed information computer 14 includes algorithms executable thereat to receive and to process feed information data related to the feeding of the confinement-fed animals of the first feedyard. And, a feedyard operation computer 16 includes algorithms executable thereat to receive and to process feedyard operation data related to the operation of the first feedyard.

The computers 12, 14, and 16 are here shown to be connected together in a networked connection, here to a computer server 18. Data input and processed at any of the computers 12, 14 and 16 can be communicated by way of the networked connections with the computer server 18.

A feedyard computer 22, forming a portion of the feedyard information system 10 of an embodiment of the present invention, is also coupled in the networked connection with the computer server 18. Thereby, the feedyard computer 22 is coupled to receive health information data input to, and processed by, the health information computer 12, feed information data input to and processed by the feed information computer 14, and feedyard operation data input to and processed by the feedyard operation computer 16. Other data is analogously accessible by the feedyard computer 22.

In another arrangement in which the computers 12, 14, 16, and 22 are not coupled in a networked connection, the data of the computers 12, 14, and 16 is provided to the computer 22, e.g., by physically transporting portable storage media containing the data to the computer 22.

In the exemplary embodiment, the algorithms executable at the computers 12, 14 and 16, comprise independent software systems. That is to say, the algorithms executable at the separate computers 12, 14, and 16 need not be integrated with one another. In operation of an embodiment of the present invention, the algorithms executable at the computers 12, 14, and 16, need only be capable of generating ASCII files to be provided to the feedyard computer 22. And, while the exemplary embodiment illustrates the feedyard computer 22 to be connected in the networked connection with the other computers 12, 14 and 16, the ASCII data may alternately be provided to the feedyard computer in other manners, for instance, by providing the ASCII data to the feedyard computer 22 on a portable storage device, such as a floppy disk, or the like.

Feedyard N also includes a feedyard computer, here referenced by 26. The feedyard computer 26 is also coupled to receive ASCII data related to, inter alia, health information, feed information, and feedyard operation data associated with the feedyard N. The feedyard computer 26 is analogous to the feedyard computer 22, coupled by way of a networked connection, to receive such data. Here, the elements together connected in the networked connection are represented by a single block, i.e., the local network 28. Again, the ASCII data can be provided to the feedyard computer 26 in other manners, as appropriate.

The feedyard computers, here the feedyard computers 22 and 26, of the feedyards are coupled to a central computer 32 by way of a communication server 33. An uplink transmission path 34 and a downlink transmission path 36 are shown to connect the feedyard computer 22 with the communication server 33. In turn, the communication server 33 is coupled to the central computer 32 by way of the lines 37 and 38. Analogously, an uplink transmission path 40 and a downlink transmission path 42 analogously couple the feedyard computer 26 with the central computer 32. While not separately illustrated, feedyard computers of other feedyards may analogously be coupled to the central computer 32, in like fashion.

The uplink transmission paths 34 and 40 permit the transmission of data related to the feedyards to which the feedyard computers 22 and 26 are associated to be uploaded to the central computer 32. The central computer is operable to pool the data provided thereto. When the data is pooled together to form the pooled data, identifiers identifying specifically from which feedyard the data pertains or is otherwise derived, is removed. Thereby, the pooled data becomes free of identifiers which identify the particular feedyard from which the data pertains. Because the pooled data includes data from, or related to, more than one feedyard, use of such data can be advantageously utilized by an operator or consultant of an individual one of the feedyards.

The pooled data formed by the central computer 32 is transmitted upon the downlink transmission paths 36 and 40 to download the pooled data to the feedyard computers 22 and 26. The pooled data is advantageously utilized by a feedyard manager or consultant. Comparisons, for instance, can be formed between data specific to the feedyard over which the management or consultant decision is to be made against the pooled data. The results of such comparisons, for instance, provide indications to the feedyard manager or consultant as to whether a problem identified in the locally-obtained data is feedyard-specific, or generic to more than one feedyard.

Because the data elements of the pooled data do not include identifiers specifically identifying from which feedyards the data elements pertain, information confidential to a particular feedyard, identifying such feedyard is not provided to any other feedyard. However, the advantageous use of the pooled data is still permitted at the various feedyards. Better-informed judgments related to feedyard operation and the health of the confinement-fed animals located thereat is permitted.

FIG. 1 further illustrates a remotely-positioned computer 46. The computer 46 is also coupled to the central computer 32, here by way of uplink and downlink transmission paths 48 and 52, respectively. Pooled data formed at the central computer 32 is also downloadable to the remote computer 46 by way of the downlink transmission path 52. And, here, the remote computer 46 is also coupled by way of a separate connection 54, with the feedyard computer 22. The connection 54 may be formed, for instance, by a modem connection with a wireline telephonic network. Data specific to the first feedyard and provided to the feedyard computer 22 is accessible at the remote computer 46 by way of such connection 54.

Because the remote computer 46 is coupled to receive both the pooled data and data specific to the first feedyard, a feedyard manager or consultant, located remote from the first feedyard, is able to access data to enable the manager or consultant to make better-informed judgments pertaining to the feedyard and the confinement-fed animals located thereat. In analogous fashion, a connection can also be effectuated with the feedyard computer 26. Access to the data stored at the computers 22 and 26 is controlled at the respective feedyards. Only authorized parties are able to access the feedyard computers 22 and 26, thereby ensuring the confidentiality of the data related to the respective feedyards. In one implementation, the feedyard-specific data of the respective feedyards is uploaded to the central computer 32 by way of the appropriate uplink transmission path 34 or 40 utilizing a store-and-forward technique, such as an e-mail transmission in which ASCII files containing the data are appended to the transmission. Pooled data is analogously downloaded by way of the downlink transmission paths 36, 42, and 52. The connections provided by way of the transmission path 54, in one implementation, similarly is effectuated.

FIG. 1 also illustrates an additional remotely-positioned computer 46'. The computer 46' is operable in analogous manner with the computer 46 and is here representative of a remote computer used by another feedyard manager or consultant, i.e., separate from the feedyard manager or consultant who uses the computer 46. The same data is provided by way of the line 52 both the computers 46 and 46'. But, the remote computer 46' is here shown to be coupled to the feedyard computer 26, rather than the computer 22, by way of the line 54'.

Lines 56 and 58 are further shown in the Figure. These lines represent access permitted, e.g., by request upon the line 56, and delivery upon the line 58, to selected data provided to the server 33 from one, or more, of the feedyard computers. For example, the owner of confinement-fed animals located at selected pens of the feedyard 1 is provided with e-mail transmission of information related to the animals. Information can similarly be provided to animal nutritionists or veterinarians in the same manner. Security is assured as access is provided only to the server 33 to request, and to be provided, with data uploaded to the server 33 from the individual feedyards.

Figure 2:
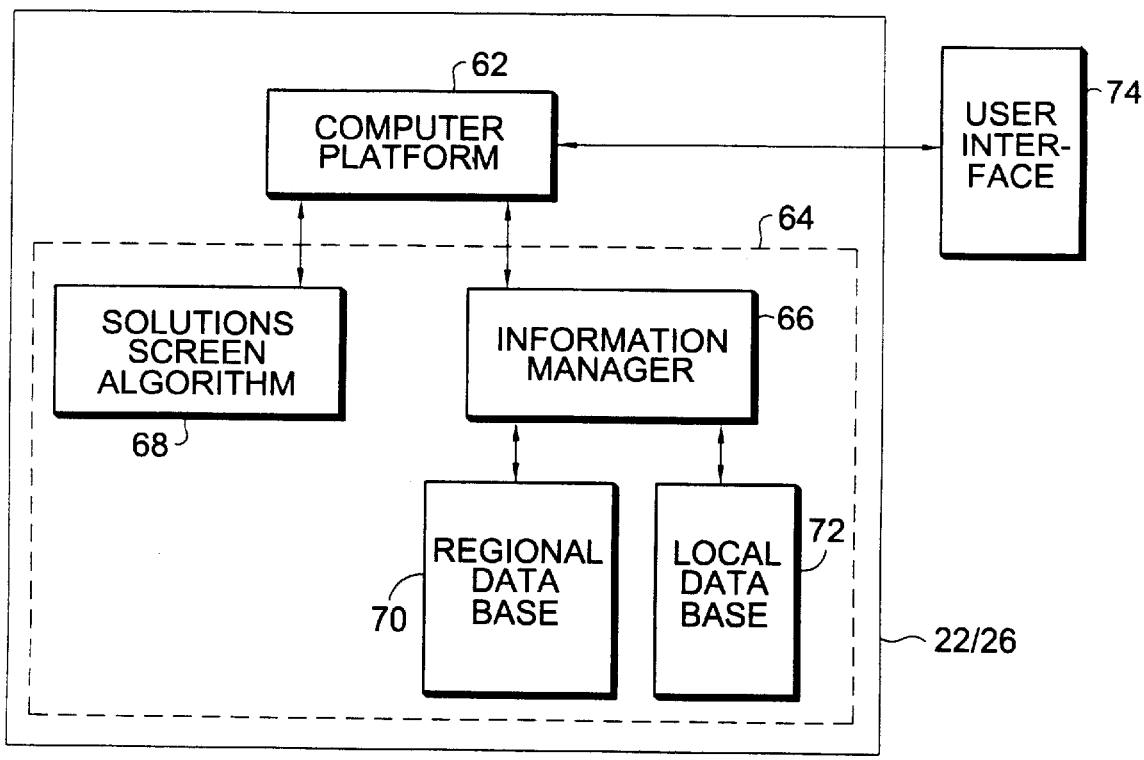
FIG. 2 illustrates a functional block diagram of a feedyard computer of an embodiment of the present invention.

FIG. 2 illustrates the feedyard computer 22 of an embodiment of the present invention and which forms a portion of the feedyard information system 10, shown in FIG. 1. The feedyard computer 26 may analogously be represented. The computer 22 is here shown to include a computer platform 62 containing a processor capable of executing algorithms thereat. The platform 62 is coupled to a feedyard computer memory 64, representative here of any conventional storage device accessible by the computer platform 62.

Algorithms forming an information manager 66 and algorithms forming a solution screen algorithm 68 are stored at the memory device 64 and retrievable by the computer platform 62 to be executed, as appropriate, during operation of the feedyard computer. Portions of the memory 64 are allocated to form a regional database portion 70 and a local database portion 72. Data stored at the database portion 70 and 72 are accessed and used by the information manager during operation of the feedyard computer. The information manager 66 is operable, when executed by the processor of the computer platform 62, to store pooled data received at the feedyard computer in the regional database portion 68 and to store local data provided to the feedyard computer in the local database portion 72. Thereafter, when data is to be utilized during operation of the feedyard computer, the information manager 66 is operable to retrieve the appropriate data elements.

The computer 62 is further shown to include a user interface 74, here a video display device and a user actuation keypad. The solution screen algorithm 68 is operable, when executed, to operate upon selected data elements of the data stored at the database portions 70 and 72 into a form for display upon the video display device of the interface 74. Various portions of the solution screen algorithm 68 are executable responsive to, for instance, user inputs entered by way of the actuation keypad of the user interface 74. Both local data and regional data stored in the local and regional database portion 70 and 72 are accessible 20 for display at the user interface 74. Thereby, a feedyard manager or consultant is better able to make informed judgments regarding operation of the feedyard and the confinement-fed animals thereat.

Figure 3:
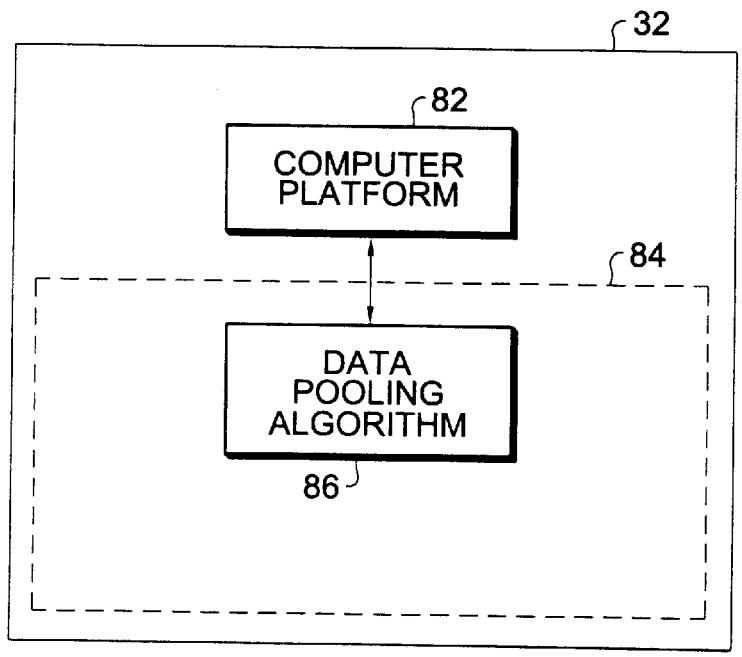
FIG. 3 illustrates a functional block diagram of a central computer operable to form pooled data according to an embodiment of the present invention.

FIG. 3 illustrates the central computer 32 of an embodiment of the present invention and which forms a portion of the feedyard information system 10, shown in FIG. 1. The computer 32 also includes a computer platform 82 having a processor forming a portion thereof. The computer 32 includes a memory 84 at which a data pooling algorithm 86 is resident. The algorithm 86 is retrievable by the computer platform 82 to be executed thereat. The data pooling algorithm is operable to pool the data received at the central computer 32 to form the pooled data therefrom. The pooled data, once formed, is storable at the central computer 32 to be retrieved and downloaded to the computers 22, 26, and 46, as appropriate, during operation of the feedyard information system 10 shown in FIG. 1.

Figure 4:
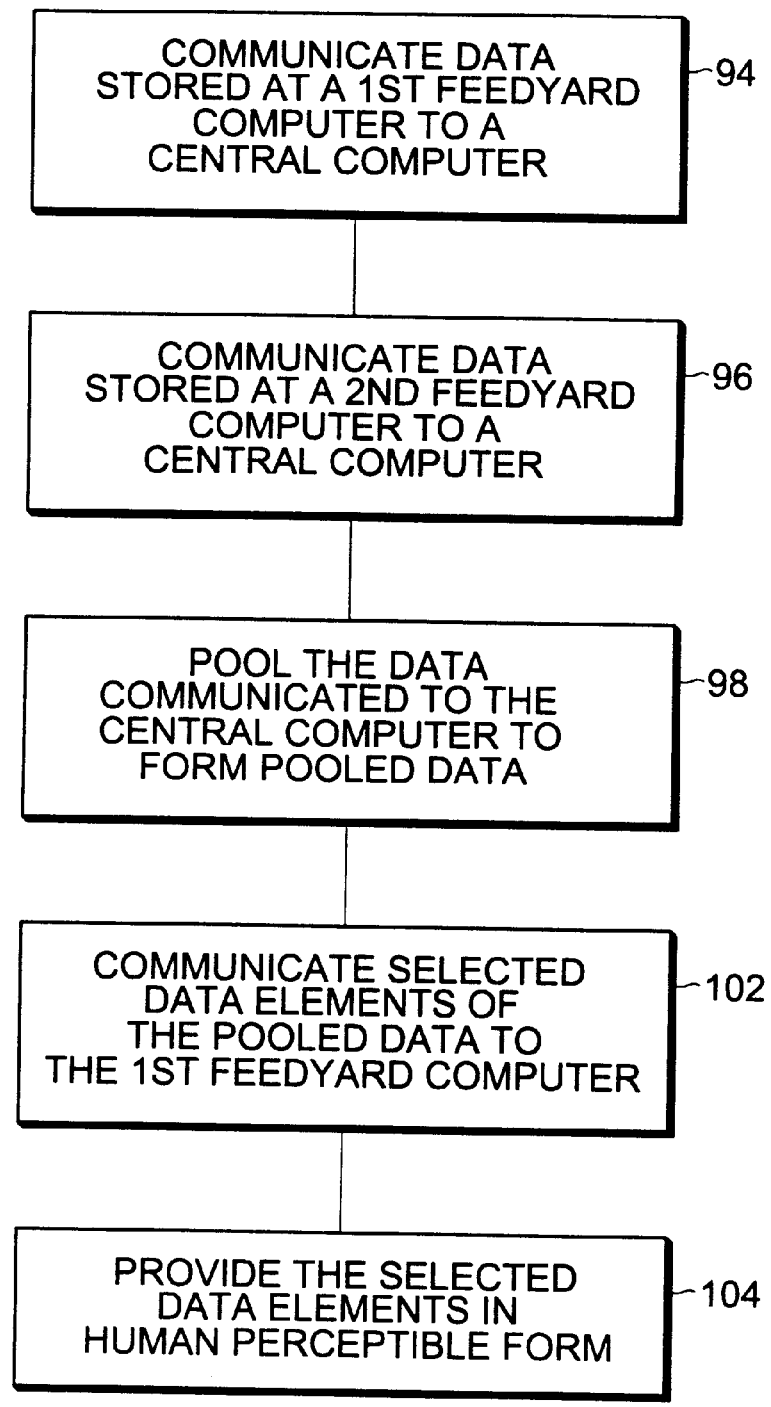
FIG. 4 illustrates a method flow diagram listing the method steps of the method of an embodiment of the present invention.

FIG. 4 illustrates a method flow diagram of the method, shown generally at 92, of an embodiment of the present invention. The method provides display data to an operator of a first feedyard.

First, and as indicated by the block 94, data stored at a first feedyard computer, and related to a first plurality of the confinement-fed animals, is communicated in electronic form to a central computer. Then, and as indicated by the block 96, data stored in at least a second feedyard computer and related to at least a second plurality of confinement-fed animals is communicated in electronic form to the central computer.

Thereafter, and as indicated by the block 98, the data communicated to the central computer is pooled to form pooled data. The pooled data includes data elements representative of both the first and second plurality of confinement-fed animals. The data elements of the pooled data are also free of identifiers, specifically identifying from which of the feedyards the data elements are derived.

Then, and as indicated by the block 102, at least selected data elements of the pooled data are communicated in electronic form to the first feedyard computer. And, as indicated by the block 104, the at least selected data elements are provided in human perceptible form to an operator of the first feedyard. From such data, the feedyard operator is better able to make judgments and decisions related to operation of the feedyard.

Advantageous use of the pooled data permits better operation of the feedyards. Because pooled data provided to the feedyards is free of identifiers which specifically identify the feedyard from which the data elements of the pooled data pertain, the privacy of individual ones of the feedyards is maintained.

The previous descriptions are of preferred examples for implementing the invention, and the scope of the invention should not necessarily be limited by this description. The scope of the present invention is defined by the following claims.

What is claimed is:

1. A feedyard information system for a plurality of feedyards, each feedyard having a plurality of confinement fed animals located thereat, the feedyard information system comprising:

a feedyard computer for each of the plurality of feedyards;

each feed yard computer for receiving animal data relating to confinement fed animals that are located at a feedyard that is associated with each of said feedyard computers;

each feedyard computer operating to convert received animal data to an animal data signal;

a central computer;

up link communication means connecting each of said feedyard computers to said central computer, and for providing said central computer with an animal data signal from each of said plurality of feedyard computers;

a data pooling algorithm at said central computer for forming pooled data from said animal data signals;

said pooled data being formed as a function of all of said animal data signals; and said pooled data having data elements that are free of identifiers that identify from which of said animal data signals said data elements were formed; and down link communication means connected from said central computer to each of said plurality of feedyard computers for providing said pooled data and said data elements to each of said plurality of feedyard computers.

2. The feedyard information system of claim 1 including:

a local database memory at each of said plurality of feedyard computers;

each local database memory storing animal data signals related to an associated feedyard; and a regional database memory at each of said plurality of feedyard computers;

said regional database memory storing said pooled data and said data elements.

3. The feedyard information system of claim 2 including:

a processor at each of said plurality of feedyard computers; and an information manager algorithm executable at each of said plurality of feedyard computers;

each of said computer information manager algorithms for managing animal data signals, pooled data and data elements stored at an associated feedyard computer.

4. The feedyard information system of claim 3 including:

a user interface at each of said plurality of feedyard computers;

each of said user interfaces including a display device and a keypad; and a solutions screen algorithm at each of said plurality of feedyard computers;

each of said solutions screen algorithms being connected to a regional database memory of an associated feedyard computer and responsive to a keypad of an associated user interface;

each of said solutions screen algorithms for generating a display in human perceptible form at an associated display device of data elements selected by said associated keypad.

5. The feedyard information system of claim 4 wherein said display provides a comparison of at least one data element to animal data signals that relate to confinement fed animals associated with an associated feedyard computer.

6. The feedyard information system of claim 1 wherein said animal data comprises animal feed data.

7. The feedyard information system of claim 6 wherein said animal data includes animal health data.

8. In a feedyard information system for a plurality of feedyards, wherein a plurality of confinement feed animals are located at each of the plurality of feedyards, a plurality of feedyard computers, one feedyard computer being associated with each of the plurality of feedyards, each feedyard computer including: regional memory; said regional memory storing polled data that is representative of a characteristic of all of said confinement feed animals that are located at said plurality of feedyards; and a solutions screen generator responsive to said regional memory for generating a display of said polled data in human perceptible form; said pooled data being free of identifiers that identify which of said plurality of feedyards said pooled data is indicative.

9. The feedyard information system of claim 8 wherein each of said feedyard computers includes:

local memory;

said local memory storing local data that is representative of said characteristic of the plurality of confinement fed animals that are located at an associated feedyard; and said solutions screen generator additionally responsive to said local memory for generating a humanly perceptible display that compares said polled data to said local data.

10. In a feedyard information system for a first feedyard in which a first plurality of confinement fed animals are located and at least a second feedyard at which an additional plurality of confinement fed animals are located, a central computer for generating polled data having data elements, said central computer including:

memory coupled to receive and store first feedyard data that is indicative of a characteristic of the first plurality of confinement fed animals, and to receive and store additional feedyard data that is indicative of said characteristic of the additional plurality of confinement fed animals;

a data pooler coupled to said memory for pooling together said first feedyard data and said additional feedyard data into pooled data having data elements that are indicative of said characteristic of the first plurality and the additional plurality of confinement fed animals; and said data elements being free of identifiers that identify which of the first feedyard and the at least second feedyard said data elements are indicative.

* * * * *